United States Patent [19]

Kuckein et al.

[11] Patent Number: 4,535,017
[45] Date of Patent: Aug. 13, 1985

[54] HEAT-RESISTANT LINING FOR WALL, SUCH AS HELICOPTER ENGINE COMPARTMENT BULKHEAD, AND WALL LINED THEREWITH

[75] Inventors: Wilfried Kuckein, Neubiberg; Albert Mylius, Brunnthal; Peter Bechtel, Ludwigshafen; Adalbert Höfer, Limburgerhof, all of Fed. Rep. of Germany

[73] Assignees: Messerschmitt-Bolkow-Blohm GmbH, Munich; G & H Montage GmbH, Ludwigshafen, both of Fed. Rep. of Germany

[21] Appl. No.: 360,983

[22] Filed: Mar. 23, 1982

[30] Foreign Application Priority Data

Mar. 24, 1981 [DE] Fed. Rep. of Germany ....... 3111596

[51] Int. Cl.³ .............................. F02C 7/24; B64C 1/40; E04B 1/76; B32B 15/14
[52] U.S. Cl. ........................... 428/77; 428/102; 428/103; 428/122; 428/920; 428/282; 428/285; 244/121; 244/133; 244/158 A; 112/404; 112/418; 112/419; 112/420
[58] Field of Search .................... 244/121, 133, 158 A; 112/404, 418, 419, 420; 428/920, 102, 103, 282, 285, 122, 123, 192, 193, 78, 77

[56] References Cited

U.S. PATENT DOCUMENTS

| 1,622,035 | 3/1927 | Hendel | 428/102 X |
|---|---|---|---|
| 2,561,891 | 7/1951 | Tucker | 428/102 |
| 2,576,698 | 11/1951 | Russum | 428/920 X |
| 2,819,032 | 1/1958 | Detrie et al. | 244/133 X |
| 3,092,530 | 6/1963 | Plummer | 428/920 X |
| 3,567,162 | 3/1971 | Lea | 244/121 |
| 3,779,006 | 12/1973 | Lewis et al. | 60/39.11 |
| 3,801,420 | 4/1974 | Anderson | 112/419 X |
| 3,948,295 | 4/1976 | Lemont et al. | 138/147 |
| 4,126,725 | 11/1978 | Shiflet | 428/920 X |
| 4,210,070 | 7/1980 | Tatum et al. | 428/285 X |
| 4,235,398 | 11/1980 | Johnson | 244/119 |
| 4,312,909 | 1/1982 | Shaw | 428/102 X |

FOREIGN PATENT DOCUMENTS

| 2433717 | 2/1975 | Fed. Rep. of Germany . |
|---|---|---|
| 1054606 | 2/1954 | France . |
| 2092721 | 6/1970 | France . |
| 2019818 | 7/1970 | France . |
| 2115184 | 7/1972 | France . |
| 2193171 | 2/1974 | France . |

Primary Examiner—George F. Lesmes
Assistant Examiner—Nancy A. B. Swisher
Attorney, Agent, or Firm—Cushman, Darby & Cushman

[57] ABSTRACT

The dividing wall between a heat producing compartment of a helicopter, such as a compartment in which an engine or other power mechanism is located, and the pilot's cabin is made of a sheet of fiberglass that cannot withstand being subjected to an operating temperature that is in excess of about 200° C. Accordingly, the hot side of the wall is lined with one or more liner blankets, each having a mineral fiber felt core, a metal foil front layer and a glass fiber fabric rear, supporting layer. These layers are quilted together and the result is provided with a binding about the periphery. The metal foil layer terminates somewhat short of the edge in order to make the margin more compressible. Each liner blanket is attached to the wall surface by a flexible adhesive. Where two or more of the blankets are used, they are placed so close together edge-to-edge that their respective margins are compressed, by abutment with one another preventing any unprotected gap.

17 Claims, 3 Drawing Figures

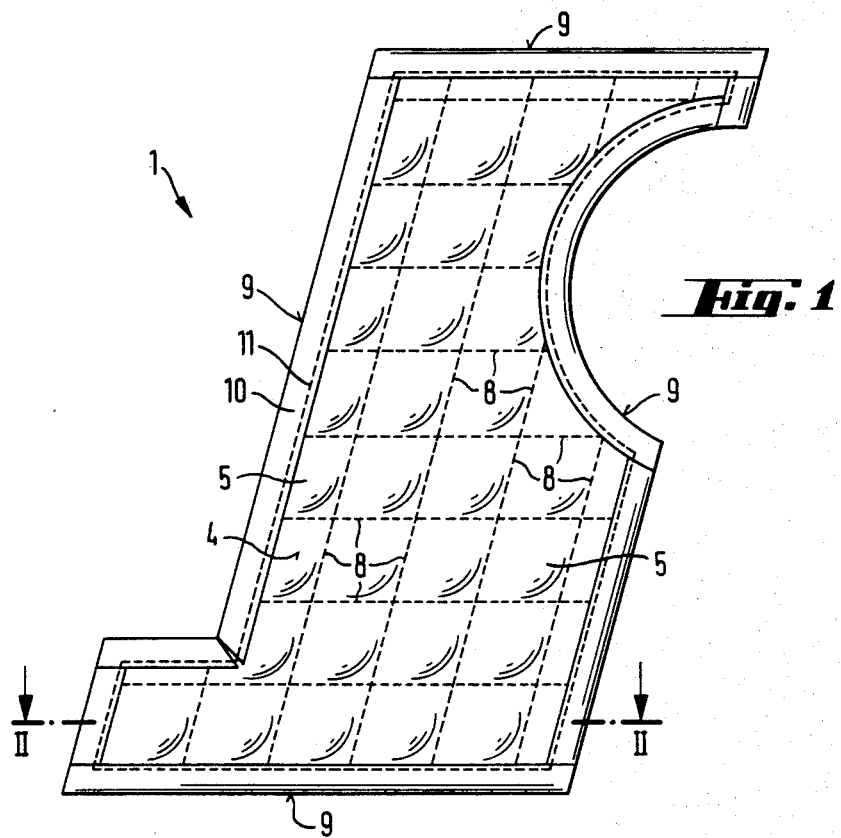
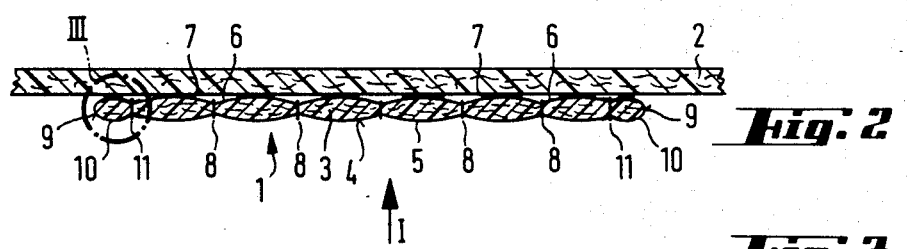
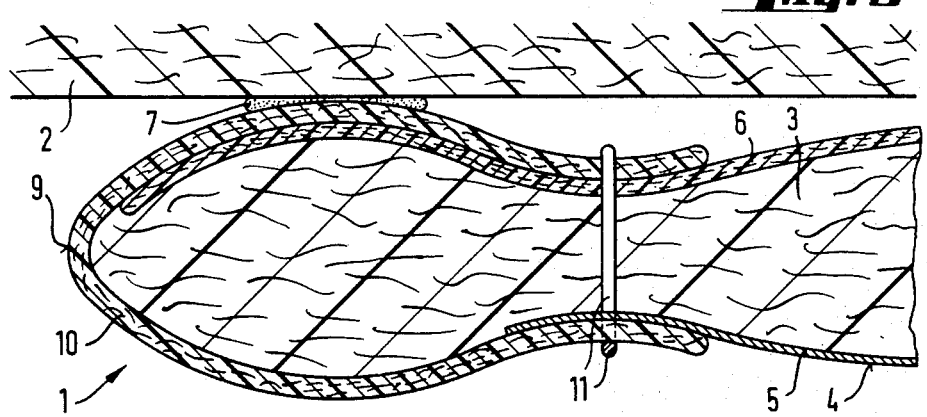

HEAT-RESISTANT LINING FOR WALL, SUCH AS HELICOPTER ENGINE COMPARTMENT BULKHEAD, AND WALL LINED THEREWITH

BACKGROUND OF THE INVENTION (1) Field of the Invention

The invention relates to a heat-resistant lining for a wall, such as the bulkhead between the engine compartment and the cabin of a helicopter, and to a wall lined with the lining of the invention.

(2) Description of the Prior Art

The walls surrounding the space in which the engine or power mechanism of a helicopter is contained may be made of glass fiber-reinforced plastic sheet. In instances where, due to heat generated by the engine or power mechanism the wall may be subjected to a temperature in excess of 200° C., some form of protection for the wall is necessary, because temperature in excess of 200° C. may harm the wall material. Further, some form of wall protection is deemed desirable especially where the wall serves as a bulkhead between the engine or power mechanism compartment and the cabin for the pilot, so that in case a fire starts in the engine or power mechanism compartment it will be contained therein for a certain period of time without spreading to the cabin. For instance, it may be required that the bulkhead be lined on the side facing the engine or power mechanism with a lining that will withstand a temperature of 1100° C. for at least five minutes without any local destruction and without any change in position of the lining relative to the wall.

A particular problem exists in the art, in trying to find a lining material which simultaneously meets all the design criteria. For instance, the desirable lining material would prevent the inside surface of the protected wall from reaching a temperature of 200° C. even when the operating temperature within the engine or power mechanism compartment usually is at a level of 250° C. The same lining material would have the above-described stability and persistance in case of fire, and be able to be attached to the wall in such a way that no damage occurs to the wall or to the lining as the lining is being installed and used, even where the wall is not flat but is irregularly configured. In particular, the lining should closely follow any irregularities in the form of the wall. Heretofore, an asbestos cardboard material has been used as the liner for such walls, the asbestos cardboard being covered on one face with an adhesive for adhering it to the inside surface of the wall that is to be protected and covered on its exposed face with a known type of paint which foams when exposed to a conflagration. Usually this paint is, in turn, covered with a layer of clear polyurethane lacquer, in order to seal the paint against attack by moisture.

This known lining material is of merely conditional suitability. One problem is with adhesion; the asbestos cardboard material adheres poorly to the inside surface of the wall and, in the case of mechanical shock, e.g. vibration, is inclined to peel off from the wall. Another problem is with the paint. The paint is designed to start its foaming reaction when subjected to a temperature that is only slightly above 200° C. The lacquer coating may be only partially successful in preventing the paint from reaching its foaming temperature under normal operating conditions. As a consequence, here and there, in local sites, the paint gets too hot and foams-up, locally destroying the polyurethane covering and thus subjecting more of the paint to heat and moisture causing more premature foaming of the fire-protective paint.

SUMMARY OF THE INVENTION

The present invention provides a lining which, in use, provides a lined, heat-resistant wall which, even under unfavorable operating conditions reliabily offers the desired protection against heat and conflagration over a long period of time.

The dividing wall between a heat producing compartment of a helicopter, such as a compartment in which an engine or other power mechanism is located, and the pilot's cabin is made of a sheet of fiberglass that cannot withstand being subjected to an operating temperature that is in excess of about 200° C. Accordingly, the hot side of the wall is lined with one or more liner blankets, each having a mineral fiber felt core, a metal foil front layer and a glass fiber fabric rear, supporting layer. These layers are quilted together and the result is provided with a binding about the periphery. The metal foil layer terminates somewhat short of the edge in order to make the margin more compressible. Each liner blanket is attached to the wall surface by a flexible adhesive. Where two or more of the blankets are used, they are placed so close together edge-to-edge that their respective margins are compressed by abutment with one another, preventing any unprotected gap.

The principles of the invention will be further discussed with reference to the drawing wherein a preferred embodiment is shown. The specifics illustrated in the drawing are intended to exemplify, rather than limit, aspects of the invention as defined in the claims.

BRIEF DESCRIPTION OF THE DRAWING

In the Drawing

FIG. 1 is an elevational view of one liner blanket provided in accordance with principles of the present invention.

FIG. 2 is a horizontal transverse sectional view of a helicopter engine compartment/pilot compartment bulkhead or wall, protected by being lined on the side facing the engine with a complete lining of liner blankets, including the liner blanket of FIG. 1. The section of the liner of FIG. 1 that is shown in FIG. 2 is taken on line II—II of FIG. 1; the viewing direction of FIG. 1 is indicated by arrow I on FIG. 2.

FIG. 3 is an enlargement of the portion enclosed by the phantom-line circle drawn on FIG. 2.

DETAILED DESCRIPTION

The wall that is to be lined is indicated at 2 in FIGS. 2 and 3. It is, for instance, the dividing wall between the engine compartment and the cabin of a helicopter, and is, for instance, made of a glass fiber-reinforced plastic sheet which is stable up to about 200° C. In use, it is the heat-facing side, e.g. the engine compartment-facing inner side which is to be covered by the lining of the present invention. That lining is intended to cover all of the wall 2 inner surface which, in normal and expected operation of the engine or other heat source within the enclosure, could otherwise be expected to be subjected to a temperature in excess of 200° C., plus any additional portion of the wall 2 inner surface which requires protection against conflagration effects. In practice, the wall 2 is unlikely to be flat and is unlikely to be regularly shaped. During operation of the helicopter, it is likely the wall 2 will be subject to vibration and flexure.

The material used to make the body of the liner blanket 1 preferably is made in indeterminate-length stock which is then cut to the shapes and sizes needed for use with a particular design of helicopter, and the cut shapes are completely edge-bound as indicated at 9 in FIGS. 1–3.

As shown, the body of the liner blanket 1 is a quilted laminate comprising a core 3 of mineral fiber felt a front surface 4 provided by a covering of metal foil 5, and a rear surface covering provided as a thin supporting layer 6.

The mineral fiber felt layer 3 is, for example, composed of aluminum silicate fiber felt having a density in the range of 50–100 kg/m$^3$, for example 64 kg/m$^3$, and a thickness up to about 15 mm, although to provide the desirable degree of flexibility and conformability to strongly-curved surfaces, a lesser maximum thickness of, for instance, 6 mm is preferred.

For the metal foil layer 5, there preferably is used a stainless steel foil of a thickness of 0.04 mm, especially a chromium-nickel-steel foil constructed in accordance with DIN specifications 14301 to 14541. Thicker foil up to a thickness of about 0.1 mm may be used without impairing the desired mechanical characteristics of the blanket.

The material of the supporting layer 6 is selected for compatability, i.e. good adhesion, with the adhesive 7 that is to be used to attach the blanket 1 to the wall 2. Further, the material of the supporting layer 6 is selected to provide good anchoring for the threads of the quilting seams 8 and binding seam 11. In the case of the preferred embodiment given by way of example, a fiberglass fabric is used.

The mineral fiber felt layer 3, the metal foil layer 5 and the supporting layer 6 are quilted together, e.g. along sewn seams 8 using a thread of difficulty-flammable material, e.g. textile filament yarn. The cross-section of the thread is so small that its own difficult flammability plays a subordinate role, yet if further protection is needed or desired, the seams 8 may be sewn using glass thread made from quartz yarn.

In order to protect the outer peripheral edge of the quilted body of the blanket 1, and to provide the finished outer peripheral margin of the blanket 1, the edge is received in a U-shaped rim 9 that is formed by a doubled-over binding strip 10, for instance made of the same or a similar fiberglass fabric to that used for the backing layer 6.

The strip 10 is preferably loosely sewn to itself through the body, as indicated at 11 in FIG. 3, so as to not place the binding strip 10 in tension about the periphery of the blanket. The same type of thread as is used for the quilting seams 8 may be used for the binding seam 11.

By preference, the marginal edge of the metal foil layer 5 lies a few milimeters short of the marginal edges of the mineral fiber felt layer 3 and backing layer 6. This is in order to make the margin of the blanket 1 more easily compressible for a tight fit both at ends of the wall 2 and at places where two blankets 1, or two spaced portions of the margin of the same blanket 1 are to be compressed together in abutment or in slightly overlapped relationship so as to ensure that there are no gaps in the protection offered for the wall 2 in such regions.

The blanket 1 preferably is attached to the wall 2 by means of a plurality of widely-distributed individual areas of adhesive 7. For the adhesive 7 there preferably is used a known silicon adhesive substance which has a good high temperature stability and which remains elastic or pliable in use, so that adhesion remains good even though, in use, the wall 2 is subject to vibration and flexure.

It should now be apparent that the heat-resistant lining for wall, such as helicopter engine compartment bulkhead, and wall lined therewith as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A soft liner blanket for lining a surface of a wall that is subject to vibrations and flexure in order to permanently protect the wall from the effects of heat in excess of 200° C. otherwise impinging on that surface under operating conditions, and of withstanding a flame temperature for an extended period of time on the order of five minutes without any local destruction and without any change in position of the liner blanket relative to the wall,
said liner blanket being generally planar and comprising:
a core layer made of minral fiber felt and having an outer peripheral edge;
an exposed front side covering of metal foil having means providing a heat-reflective front surface;
a rear covering made of a fabric for providing a supporting layer;
said front side covering of metal foil terminating several millimeters short of said outer peripheral edge of said core layer so as to provide a compressible marginal rim about the outer periphery of the liner blank, said liner blanket within said rim being as a result more compressible in the plane of said liner blanket than is said liner blanket in a main portion thereof that is defined inwardly of said marginal rim;
said rim being composed of a fabric layer of fiberglass material; and
means effectively securing said rim layer on said front side covering, on said core layer and on said rear covering so that said rim is loosely enclosed by said rim layer.

2. The liner blanket of claim 1, wherein:
said metal foil is made of stainless steel.

3. The liner blanket of claim 1, further including:
said core layer having a rear covering made of fiberglass fabric for providing a supporting layer.

4. The liner blanket of claim 3, further comprising:
a plurality of widely distributed areas of adhesive disposed on said supporting layer for attaching the liner blanket to the wall surface.

5. The liner blanket of claim 4, wherein:
the adhesive is one which remains flexible in normal use.

6. The liner blanket of claim 3, further including:
seam means quilting the metal foil to the supporting layer through the mineral fiber felt core layer.

7. The liner blanket of claim 6, wherein:

said layer of fiberglass fabric is sewn to the core and metal foil covering, substantially without tension, by a margin-paralleling seam.

8. A wall having a surface lined with the liner blanket of claim 1.

9. A lined wall, comprising:
a wall made of a material which is subject to vibrations and flexure, and which is deleteriously affected when subjected on at least a first portion of one surface thereof to heat in excess of about 200° C.;
a soft lining, covering at least all of said first portion of said surface of said wall, for permanently preventing said portion from reaching said excessive temperature in normal use, and for retarding for an extended time on the order of five minutes the time it takes for said portion to reach said excessive temperature in case of these being a conflagration in the vicinity of said portion without any local destruction and without any change in position of the lining relative to the wall,
said lining comprising:
a soft liner blanket that is generally planar, comprising:
a core layer made of mineral fiber felt and having an outer peripheral edge;
an exposed front side covering of metal foil having a heat-reflective front surface; and
a rear covering made of a fabric for providing a support layer;
said front side covering of metal foil terminating several millimeters short of said outer peripheral edge of said core layer so as to provide a compressible marginal rim about the outer periphery of the liner blanket, said liner blanket within said rim being as a result more compressible in the plane of said liner blanket than is said liner blanket in a main portion thereof that is defined inwardly of said marginal rim;
said rim being composed of a fabric layer of fiberglass material; and
means effectively securing said rim layer on said front side covering, on said core layer and on said rear covering so that said rim is loosely enclosed by said rim layer;
said core layer having a rear covering made of fiberglass fabric for providing a supporting layer;
a plurality of widely-distributed areas of adhesive disposed on said supporting layer, and areas of adhesive attaching said liner blanket to said wall surface so as to completely cover said first portion thereof.

10. The lined wall of claim 9, wherein:
said metal foil is made of stainless steel.

11. The lined wall of claim 9, further comprising:
seam means quilting the metal foil to the supporting layer through the mineral fiber felt core layer.

12. The lined wall of claim 9, wherein:
the adhesive is one which remains flexible in normal use.

13. The lined wall of claim 9, wherein:
said layer of inorganic material covering said rim is made of fiberglass fabric.

14. The lined wall of claim 13, wherein:
said layer of fiberglass fabric is sewn to the core and metal foil covering, substantially without tension, by a margin-paralleling seam.

15. The lined wall of claim 14, further comprising:
said wall surface having a second portion in need of protection against heat, said second portion being located contiguous to the first described said portion;
said lining further including a second generally planar liner blanket comprising:
a core layer made of mineral fiber felt and having an outer peripheral edge;
an exposed front side covering of metal foil; and
said front side covering of metal foil terminating several millimeters short of said outer peripheral edge of said core layer so as to provide a compressible marginal rim about the outer periphery of the liner blanket, said liner blanket within said rim being as a result more compressible in the plane of said liner blanket than is said liner blanket in a main portion thereof that is defined inwardly of said marginal rim;
said rim being covered with a layer of inorganic material; and
means effectively securing said rim covering layer on said front side covering and on said core layer so that said rim is loosely enclosed by said rim covering layer;
said core layer having a rear covering made of fiberglass fabric for providing a supporting layer;
a plurality of widely-distributed areas of adhesive disposed on said supporting layer, said areas of adhesive attaching said liner blanket to said wall surface so as to completely cover said second portion thereof;
the compressible marginal rim of the first-described liner blanket being abuttingly compressed against the compressible marginal rim of said second liner blanket along a respective portion of each said rim and the compressible marginal rim of said second liner blanket being abuttingly compressed against the compressible marginal rim of said first-described liner blanket along said respective portion of each said rim, so as to leave no unlined gap between said liner blankets.

16. The lined wall of claim 9, wherein:
said surface portion of said wall is curved.

17. The lined wall of claim 9, wherein:
the mineral fiber felt of said core layer has a density of between 50 and 100 kg/m$^3$ and a thickness of from several millimeters up to 15 millimeters;
the rim covering layer is made of fiberglass fabric and is sewn to said front side covering said core layer and said rear covering layer to provide said effectively securing means;
said core layer is quilted to said front side covering and said rear covering layer;
said adhesive is of a permanently flexible type.

* * * * *